July 19, 1932.  E. H. REMDE  1,868,176
INDUSTRIAL TRUCK
Filed Oct. 28, 1926  2 Sheets-Sheet 1
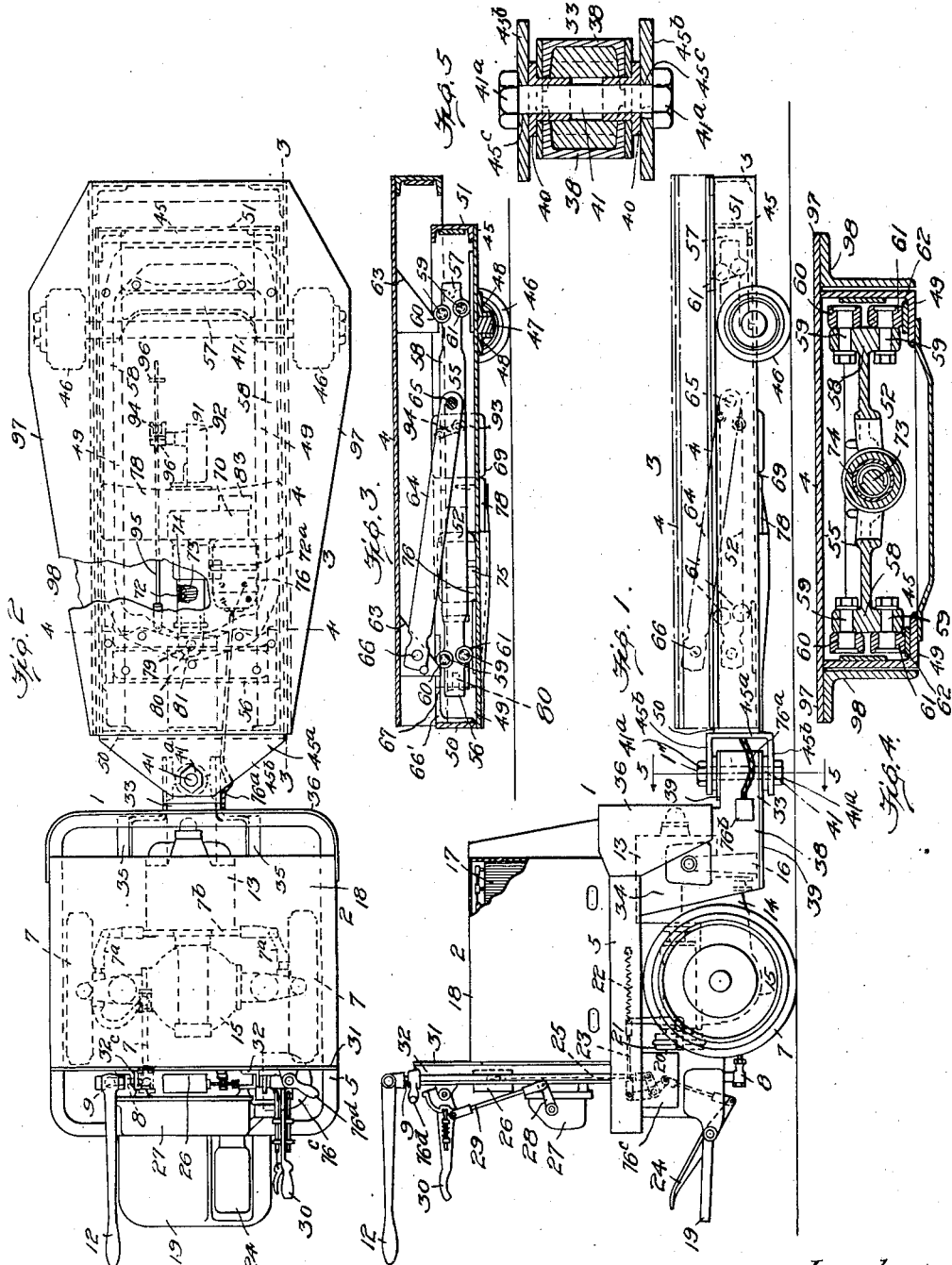
Inventor
Edward N. Remde
By Geo. A. Pitts
Atty July 19, 1932. E. H. REMDE 1,868,176
INDUSTRIAL TRUCK
Filed Oct. 28, 1926 2 Sheets-Sheet 2
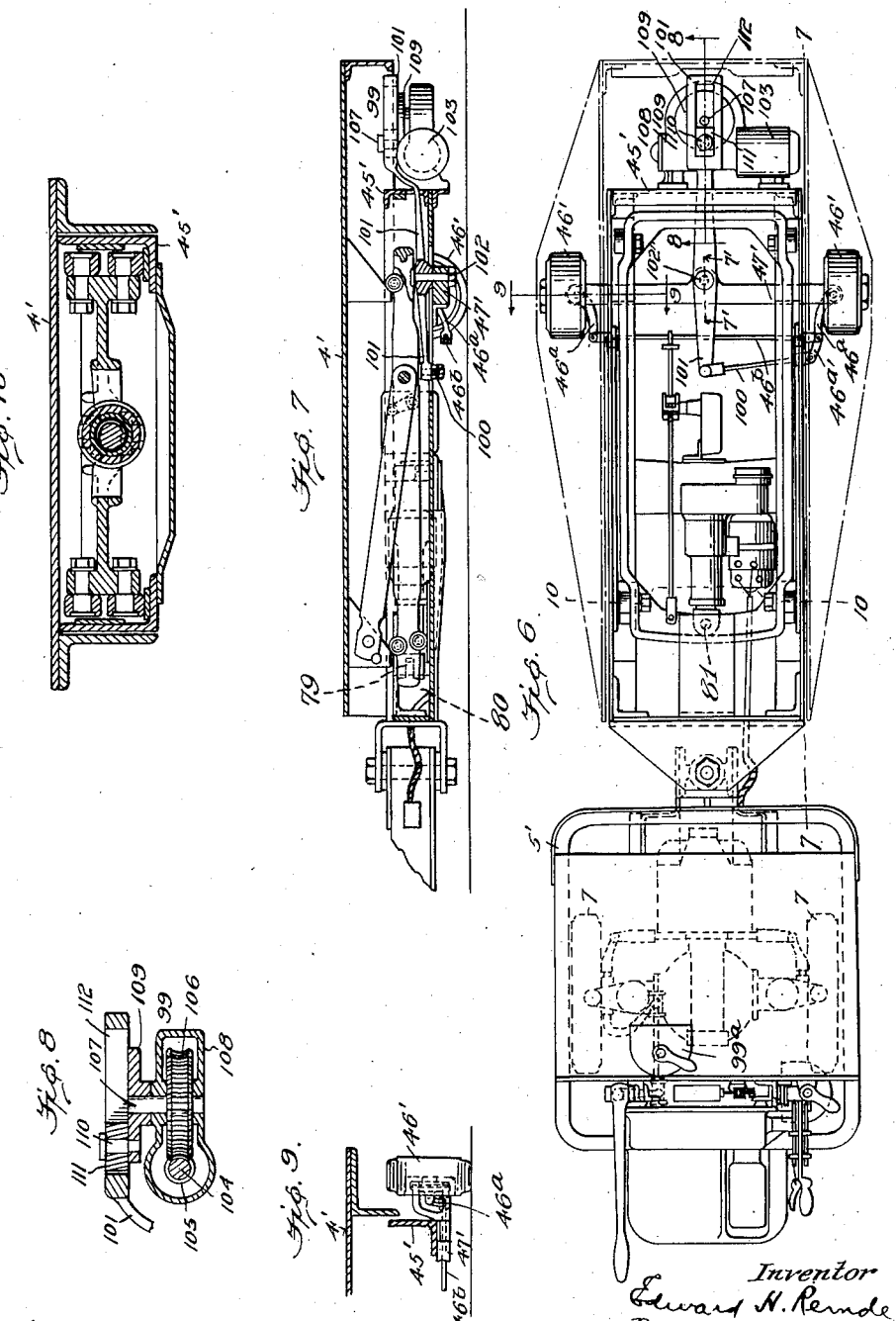
Inventor
Edward H. Remde
By Geo A Pitts
Atty Patented July 19, 1932

1,868,176

UNITED STATES PATENT OFFICE

EDWARD H. REMDE, OF CLEVELAND, OHIO, ASSIGNOR TO THE BAKER-RAULANG COMPANY, OF CLEVELAND, OHIO, A CORPORATION OF OHIO

INDUSTRIAL TRUCK

Application filed October 28, 1926. Serial No. 144,771.

This invention relates to an industrial truck capable of handling loads or load units and is particularly adapted to use (a) in picking up or discharging load units where congested conditions or restricted areas or floor space prevail, (b) in loading and unloading compartments or spaces of predetermined areas, such as freight cars, and (c) in carrying out my improved process of loading and unloading freight cars described and claimed in my co-pending application Serial No. 143,701 filed Oct. 23, 1926.

One object of the invention is to construct a truck of this character that is relatively simple in construction and easily operated to effect loading and unloading operations.

Another object of the invention is to provide a truck of this character so constructed that its load carrying portion may be positioned at an angle to its traction portion to facilitate the loading of a load or the discharge of a load.

A further object of the invention is to provide a truck capable of use in carrying out the process disclosed in my aforesaid co-pending application, but in which the construction is simplified, whereby its operation is facilitated and range of use greatly increased.

Another object of the invention is to provide a truck of this character having a sectional frame, whereby one section thereof may be controlled and manipulated by the operator to readily position it in loading or unloading position.

Other objects of the invention will be apparent to those skilled in the art to which my invention relates from the following description taken in connection with the accompanying drawings, wherein Fig. 1 is a side view of a truck embodying my invention.

Fig. 2 is a plan view of the truck.

Fig. 3 is a section on the line 3—3 of Fig. 2.

Fig. 4 is a section on the line 4—4 of Fig. 1.

Fig. 5 is a section on the line 5—5 of Fig. 1.

Fig. 6 is a plan view of a truck embodying a modified form of construction (the platform being omitted).

Fig. 7 is a fragmentary section partly on the line 7—7 and partly on the line 7'—7' of Fig. 6.

Fig. 8 is a fragmentary section on the line 8—8 of Fig. 6.

Fig. 9 is a fragmentary section on the line 9—9 of Fig. 6.

Fig. 10 is a horizontal section through Fig. 7.

In the drawings, 1 indicates as an entirety a truck comprising two members 2, 3, pivotally connected together intermediate their ends, as shown at 1″, whereby the sections may be disposed at angles to each other, as will later appear to permit the loading and unloading of load units under conditions for which ordinary types of trucks, including elevating platform and tiering types would be impractical.

The truck member 2 comprises a suitable frame 5, supported by wheels 7 which are both driven and steered as will later appear. The wheels 7 are driven through a suitable power transmission mechanism by a motor 13. The motor 13 is mounted in and secured to a cradle 14 which is shaped to form a housing 15 for the power transmission mechanism. The cradle 14 and housing 15 are preferably connected to the frame 5 by a suspension mechanism, one element of which is shown at 16. No claim is made herein to such mechanism since the same forms the subject-matter of an application Ser. No. 430,620 filed by John H. Hertner of Cleveland, Ohio, and myself jointly (see Letters Patent No. 1,628,145). The wheels 7 are mounted on suitable knuckles whereby they may be steered, their spindles being provided with arms 7a, connected by a tie rod 7b and one spindle is provided with an arm 7c connected to a crank or lever 8 on the lower end of a steering column 9. The column 9 is provided with a lever or handle 12, whereby the wheels are steered in a well known manner. 17 indicates the source of power supply, that illustrated comprising batteries suitably connected to the motor 13 and also the motor for operating the load handling mechanism to which reference will later be made. The batteries 17 are mounted on the frame 5 and may be enclosed in a casing 18. 19 indicates the platform on which the operative stands. 20 indicates as an entirety a brake mechanism, the braking elements of which engage a wheel 21 fixed to the extended end of the shaft for the motor 13, being normally held in engagement therewith by means of a spring 22. The braking elements are connected by a suitable linkage 23 to a foot pedal 24, associated with the platform 19 in convenient position for the operative to operate. When operated downwardly, the pedal 24 releases the braking elements from the wheel 21 and also, through a linkage 25, closes a switch in the motor circuit; this switch being mounted in a box or casing 26. 27 indicates a controller of any well known construction, being connected through an arm 28 and link 29 to a handle 30 in convenient position for operation by the operative. When operated, the controller serves to connect in the motor 13 to drive it in either direction. 31 indicates a dash mounted on uprights 32 and supporting the casing 26, and controller 27.

33 indicates a connector extending rearwardly from and preferably in a plane below the frame 5. The connector is connected to the lower ends of a pair of drop plates 34, the upper portions of which are inclined outwardly and suitably connected to the sills 35 forming part of the frame 5. The plates 34 may be braced by a plate 36 to which they may be connected in any desired manner. The connector 33 may comprise two channel bars 38 having their flanges in opposed relation and connected by plates 39. The plates 39 are formed with aligned openings to receive flanged bushings 40, which support a pivot pin 41, arranged to pivotally connect the truck members 2, 3, together as will later appear. The truck member 3 may consist of a load carrying frame, but by preference it includes a load handling mechanism, such as an elevating platform 4, whereby the latter can be projected below a load and then elevated to lift it and transport it to a point of discharge and then discharged as is customary in operations of this character.

The load handling and carrying member 3 comprises a frame 45 mounted on a plurality of wheels 46. In the illustrated form of construction I provide two wheels, suitably mounted on an axle 47 disposed intermediate the ends of the frame 45 and secured thereto by angles 48. The frame 45 consists of angles 49 connected together at their front ends by a bar 50 and at their rear ends by a channel 51, the flanges of the angles 49 being turned inwardly to form a support for the elevating mechanism 52.

At its inner end, the frame 45 carries a U-shaped member 45a, the leg portions 45b of which straddle the connector 33 and are formed with aligned openings 45c through which the pivot pin 41 extends, the pin being preferably keyed to one of the leg portions 45b. The opposite ends of the pin 41 are threaded to receive clamping nuts 41a, by means of which the pin is held in position.

The elevating mechanism 52 may be of any desired construction to raise and lower the platform 4, but by preference such mechanism is substantially similar to that disclosed in Letters Patent No. 1,527,136, dated February 17, 1925, which issued upon the application of John H. Hertner.

Of the elevating mechanism 52, 55 indicates a frame having end members 56, 57, and side members 58. On opposite sides and near its opposite ends the walls of the frame 55 are thickened and formed with openings in which are mounted stub shafts 59. The upper shafts 59 carry flanged rollers 60, while the lower shafts carry flanged rollers 61, which engage suitable guides 62 mounted on the inturned flanges of the angles 49 and permit the frame 55 to move endwise horizontally in opposite directions on the frame 45 to effect the raising and lowering of the platform 4. The lowermost or normal position of the platform 4 is shown in Figs. 1 and 4. When the platform 4 is in this position, the intermediate frame 55 is arranged adjacent to that end of the frame 45 remote from the batteries (see Fig. 1) and when moved forward, it operates through the engagement of the rollers 60 and inclines 63, suitably secured to the lower side of the platform 4, to elevate it to the position shown in Fig. 3. The platform 4 is held against longitudinal movement by a pair of links 64 preferably pivoted at their opposite ends in any well known manner to the frame members 49 and platform 4, as shown at 65, 66. As will be understood, the links 64 permit the platform 4 to move in a substantially vertical direction, but hold it against longitudinal movement in order that the rollers 60 may co-act with the inclines 63 to elevate the platform.

66' indicates means for maintaining the frame 55 in sliding engagement with its guides 62 thereby preventing tilting of the frame 55 or movement of its inner end upwardly due to the positioning of a load at or adjacent its outer end. The means 66' are secured to the frame 45, being preferably carried by the bar 50. In the illustrated form of construction, the means 66' comprise a plate 67 extending over the frame 55 and having a downwardly bent section which is secured to the bar 50.

69 indicates the power mechanism for moving the frame 55 forwardly and rearwardly on the guides 62 to effect the raising and lowering of the platform 4. Of this mechanism, 70 indicates a hollow casing forming a suitable chamber for speed reducing gears and a chamber 72 for a screw or worm 73 and a nut 74. 75 indicates a cradle or other suitable device for connecting an electric motor 76 to the casing 70, preferably that portion thereof forming the chamber 72, being preferably secured to the cradle by a band 72a. The motor 76 is supported so that it may be readily connected to a shaft of the gearing within the casing 70. The motor 76 is arranged to rotate the screw or worm 73 in either direction to raise or lower the platform 4. The casing 70 is rigidly connected to the frame members 49 and a cross member 78 in a well known manner. The motor 76, speed reducing gears and other elements, forming parts of the power mechanism are preferably constructed similarly to corresponding parts set forth in Letters Patent No. 1,505,889 dated August 19, 1924, and therefore further description will not be necessary herein.

The nut 74 preferably comprises a hollow thrust member, which slidably fits at its inner end into an opening, leading into the chamber 72. The inner wall of the thrust member is threaded to engage the screw 73. The outer end of the nut 74 is bifurcated at 79 to receive between them the web portion 80 at the inner end of the intermediate frame 55. The bifurcations 79 and web portion 80 are formed with openings, adapted to register with each other to receive a pin 81, whereby the nut and frame 55 are connected together.

The motor 76 is supplied with current from the batteries 17 by a cable 76a, having a plug connection with a socket 76b carried on the connector 33 (see Fig. 1).

76c indicates a controller for the motor 76, suitably supported on the frame 5 and operated by a handle 76d. The motor shaft extends through the casing 70 and carries on its outer or free end a disk, which constitutes one element of a brake 83.

The brake 83 may be similar in construction to that shown and described in my said co-pending application filed Oct. 23, 1926.

The limit switch mechanism 91 comprises a casing 92 secured to the cross member 78 and enclosing a pair of switches either of which is opened to break the motor circuit by a device operated by the rock shaft 93. 94 indicates an arm fixed to the rock shaft 93. The outer end of the arm is bifurcated and formed with aligned openings to receive a rotatable plug which is slotted to slidably receive a bar 95. The inner end of the bar 95 is pivotally connected to the frame 55; its outer portion is provided with tappets 96 disposed on opposite sides of the arm 94, whereby movement of the frame 55 in either direction will move one of the tappets into engagement with the arm 94 and cause it to swing and thus rock the shaft 93 which in turn will open one of the switches and break the circuit to the motor 76. As will be understood, the tappets 96 are adjustably secured on the rod 95 and are positioned to effect opening of the circuit when the platform 4 reaches its limit of movement in either direction. The platform 4 is preferably extended outwardly beyond the frame 45 and has lateral portions 97 forming guards for the wheels 46. The side edges of the platform may be reinforced by the angles 98.

From the foregoing description it will be seen that my truck consists of articulated portions or members and that by steering and driving the wheels 7, the inner end of the frame 5 may be swung in either direction as driving forwardly or backwardly takes place, and these movements of the frame 5 serve to turn or swing the inner end of the frame 45 laterally and thus effect articulation between the frames 5 and 45. It will thus be seen that the truck may be driven in either direction along rectilinear and curvilinear paths at the will of the operator, with the result that the load carrying member 3 can be positively controlled to position it below a load or to discharge the load in any desired position, in or among obstructions where an ordinary elevating truck would be incapable of movement endwise, and also to effect loading and unloading of a maximum number of loads in a predetermined space, as already set forth. This form of construction also permits the truck to be driven through lanes having relatively sharp angular turns.

In Figs. 6 and 7 I have shown a modified form of construction wherein all four wheels of the truck are steerable, whereby control and movement of the load handling member 3 as well as both frame members 2, 3, are greatly facilitated in carrying out various loading and unloading operations. In these views, the construction of the truck is similar to that shown in Figs. 1, 2, 3 and 4, except that the wheels 46' are steerable independently of the wheels 7, so that the truck may be steered to move in a curvilinear direction or to move along an oblique line to thus permit the ready positioning of the frame 45' and platform 4' relative to a load or the space a load is to occupy when discharged. The wheels 46' may be steered by manually operated devices or by suitable power means on the frame 5', but by preference I provide an electrically operated power means 99 on the frame 45' and control the operation of its motor by a controller 99a mounted in convenient position for the operative to operate. The wheels 46' are preferably supported on knuckles on the opposite ends of the axle 47' and the spindles for the wheels are provided with arms 46a connected by a tie rod 46b. One arm 46a is provided with an extension 46a' to which is pivotally connected one end of a link 100. The opposite end of the link 100 is connected to a lever 101, preferably fulcrumed at 102 on the axle 47' and operatively connected to the power means 99, as will later appear. Of the power means 99 herein shown for illustrative purposes, 103 indicates a motor arranged to drive a shaft 104. The shaft 104 is provided with a worm 105 which meshes with a worm gear 106 fixed to a shaft 107. The shaft 107 is preferably supported in bearings provided in the walls of a casing 108 which encloses the worm and worm gear. The shaft 107 carries a disk 109 having a crank pin 110, on which is mounted a block 111 free to oscillate thereon. The block 111 slidably fits an elongated slot or guide-way 112 formed in the outer end of the lever 101 and may move endwise therein as the disk 109 rotates. By operation of the controller 99a, the motor 103 may be set in operation in either direction to rotate the disk 109 which in turn through the block 110 and walls of the guide-way 112, will swing the lever 101 in either direction and thereby effect turning of the wheels 46', the current to the motor being cut off when the wheels are turned to the desired extent.

As already set forth, the wheels 7 and 46' are steered independently. This permits the truck members to be positively controlled to readily position the load carrying member in relation to a load or the discharging position of a load and it also permits the bodily movement of the truck in rectilinear directions, directions oblique to its longitudinal axis and in curvilinear directions.

From the foregoing description it will be seen that the construction is relatively simple and the over-all length is relatively short which permits use of the truck under congested conditions and enables it to be readily operated in limited areas, such as loading and unloading freight cars, so that my process of loading and unloading, as set forth in my co-pending application can be carried out with rapidity.

To those skilled in the art to which my invention relates, many changes in construction and widely differing embodiments and applications of the invention will suggest themselves without departing from the spirit and scope thereof. My disclosures and the description herein are purely illustrative and are not intended to be in any sense limiting.

What I claim is:

1. In a truck construction, the combination of a frame comprising a load bearing member and a traction member, a single pair of wheels for supporting each of said members, a pivotal connection having a vertical axis between said pairs of wheels for connecting said members together to permit one member to be positioned in angular relation to the other, said pairs of wheels and said pivotal connection co-operating to support said members in horizontal relation while permitting their relative pivotal movement about said vertical axis, one of said pairs of wheels being steerable, means for steering the steerable wheels, and means carried by one of said members for driving its supporting wheels in either direction and arranged to cooperate with said steering means to effect the movement and positioning of the other member into an angular relation thereto.

2. A construction as claimed in claim 1 in which means are provided for steering each said pair of wheels independently of the other pair.

3. A construction as claimed in claim 1 in which each said member is provided with means for steering the wheels therefor independently of the steering of the wheels for the other member.

4. In a truck construction, the combination of a frame comprising a traction member having a relatively low portion at its inner end, a load carrying member disposed substantially in the plane of said low portion, a single pair of wheels for supporting each said member and a pivotal connection having a vertical axis between said pairs of wheels for connecting said low portion and said load carrying member together to permit said members to articulate about said axis during driving of the truck, one of said pairs of wheels being steerable, means for steering the steerable wheels, and means for driving the pair of wheels for said traction member in either direction.

5. In a truck construction, the combination of a frame comprising a main member having a relatively low portion at its inner end, a load carrying member disposed substantially in the plane of said low portion, a single pair of wheels for supporting each said member and a pivotal connection having a vertical axis between said pairs of wheels for connecting said low portion and said load carrying member together to permit said members to articulate about said axis during driving of the truck, one of said pairs of wheels being steerable, means for steering the steerable wheels, and means for driving said steerable wheels.

6. A construction as claimed in claim 4 in which the load carrying member is disposed in substantially the same plane as the low portion of said traction member.

7. In an industrial truck, the combination of a frame comprising a traction member and a load carrying member, a single pair of wheels for supporting each of said members, the pair of wheels for said traction member being steerable, a pivotal connection having a vertical axis between said pairs of wheels for pivotally connecting said members together to permit one member to be positioned in angular relation to the other member during driving of the truck, said pairs of wheels and said pivotal connection cooperating to support said members in horizontal relation while permitting their relative pivotal movement about said vertical axis, and means for driving said steerable wheels for said traction member.

8. In an industrial truck the combination of a frame comprising a traction member and a load carrying member, a single pair of steerable wheels for supporting each of said members, a pivotal connection having a vertical axis between said pairs of wheels to permit one member to be positioned in angular relation to the other member during driving of the truck, power means on said load carrying member for steering the wheels therefor, means for driving the wheels for supporting said traction member, and means for steering the wheels of said traction member and controlling the power means that steer the wheels for said load carrying member.

9. In a truck construction, the combination of a frame comprising a traction member having a relatively low portion at its inner end, a load carrying member disposed substantially in the plane of said low portion and having a load elevating mechanism, a single pair of wheels for supporting each said member and a pivotal connection having a vertical axis between said pairs of wheels for connecting said low portion and said load carrying member together to permit said members to articulate about said axis during driving of the truck, one of said pairs of wheels being steerable, means for steering the steerable wheels, and means for driving the pair of wheels for said traction member in either direction.

10. In a truck construction, the combination of a frame comprising a traction member having a relatively low portion and a load carrying member disposed in substantially the same plane as said low portion and having an elevating mechanism and means for connecting said low portion and load carrying member together to articulate about a vertical axis, a pair of steerable wheels for supporting each member, means for driving the pair of wheels for said traction member, and power means on said load carrying member for steering the wheels for said load carrying section.

11. In an industrial truck, the combination of a frame comprising a traction member having a relatively low portion at its inner end and a load carrying member having a lifting platform normally disposed substantially in the plane of said low portion, a pair of wheels for supporting each of said members, the wheels for supporting said traction member being steerable, a pivotal connection having a vertical axis disposed between said pairs of wheels to permit one member to be positioned in angular relation to the other member during driving of the truck, means for driving the wheels for supporting said traction member, and means on said traction member for controlling said driving means and the steering of the wheels for said traction member.

12. In an industrial truck, the combination of a frame comprising a traction member and a load carrying member having a load handling device, a pair of steerable wheels for supporting each of said members and a pivotal connection having a vertical axis between said pairs of wheels to permit one member to be positioned in angular relation to the other member during driving of the truck, means for driving the wheels for supporting said traction member, power means on said load carrying member for steering the wheels that support said member, and means on said traction member for steering the wheels therefor and for controlling the power means for steering the wheels for said load carrying member.

In testimony whereof, I have hereunto subscribed my name.

EDWARD H. REMDE.